United States Patent [19]

Scanlon

[11] Patent Number: 4,509,556

[45] Date of Patent: Apr. 9, 1985

[54] FLOW CONTROL FOR VALVE INTERFACE

[75] Inventor: James E. Scanlon, Madison Heights, Mich.

[73] Assignee: Ross Operating Valve Company, Detroit, Mich.

[21] Appl. No.: 377,935

[22] Filed: May 13, 1982

[51] Int. Cl.³ ............................................. F16K 11/20
[52] U.S. Cl. .................................. 137/884; 137/887; 251/213; 251/266; 251/309; 74/104
[58] Field of Search ............... 137/594, 884, 886, 887; 251/209, 213, 266, 270, 304, 309, 312; 74/104

[56] References Cited

U.S. PATENT DOCUMENTS

| | | | |
|---|---|---|---|
| 192,622 | 7/1877 | Guild et al. | 251/304 |
| 667,350 | 2/1901 | Ulrich et al. | 74/104 X |
| 2,712,242 | 7/1955 | Davis | 74/104 X |
| 3,513,876 | 5/1970 | Tarbox | 137/596 |
| 4,377,183 | 3/1983 | Johansson et al. | 137/884 X |

FOREIGN PATENT DOCUMENTS 589510  3/1959  Italy ..................................... 251/304

Primary Examiner—A. Michael Chambers
Assistant Examiner—John C. Fox
Attorney, Agent, or Firm—Harness, Dickey & Pierce

[57] ABSTRACT

A flow control for base mounted valves having a number of ports that extend through it and valve elements that are positioned for directly controlling the flow through at least certain of the ports. The valve elements include operators that are accessible at one end of the valve block for controlling the valve elements.

7 Claims, 5 Drawing Figures

4,509,556

FLOW CONTROL FOR VALVE INTERFACE

BACKGROUND OF THE INVENTION

This invention relates to an immproved flow control valve assembly and more particularly to an improved flow control arrangement adapted to be used in connection with base mounted fluid systems.

The use of base mounted valves and their advantages are well known. With such fluid systems, a valve base is provided in which flow passages are formed. Various valving elements and fluid system components may be mounted to these bases so as to afford the desired fluid connections while limiting the use of external piping. Although such arrangements are particularly advantageous in reducing complexity of the plumping of the system, they do have some disadvantages because of their inherent compactness. Many times it is necessary to embody a throttle arrangement in one or more of the fluid lines for controlling air flow and, accordingly, speed of reaction of the system or for other purposes. With the base mounted valve assemblies of the type heretofore known, such throttling has been achieved by the use of a special valve base that employs throttling passages having flow controlling needle valves or the like. Obviously, the necessity of coring the valve bodies to form such passages adds greatly to their expense. Furthermore, in many instances the valve itself is not readily accessible due to the compact arrangement of the fluid system. That is, it is necessary or desirable to have the actuator for the valve element disposed at the front of the valve body so that adjustments may be easily made and associated components will not block the adjusting elements. In many instances there are two or more flow controlling valve assemblies in a given valve base. With such an arrangement it is obviously important that the operators for each of these valve may be conveniently accessed. It is particularly desirable if all of the valve actuators are disposed at one end of the valve body. With previously proposed constructions, this has not been possible. In addition to the aforenoted defects, the use of special coring gives rise to flow restrictions which, under some circumstances, are not desirable.

It is, therefore, a principal object of this invention to provide an improved flow control assembly for use with base mounted valves.

It is another object of this invention to provide a simplified low cost and yet highly effective valve assembly.

It is another object of this invention to provide an improved valve assembly wherein throttling is possible while at the same time maximum flow capabilities are not adversely affected.

It is another object of this invention to provide a flow control valve assembly wherein the valve operator is positioned to be readily accessible for adjustment.

SUMMARY OF THE INVENTION

A first feature of this invention is adapted to be embodied in a flow control element for interposition in a fluid system comprising a valve body adapted to be interposed between a pair of elements of the system having fluid ports that are intended to communicate with each other. The valve body has a flow port extending between opposite faces thereof that are adapted to provide communication between the elements ports when received therebetween. The flow port has a non-cylindrical cross-section. A valve element is rotatably supported in the valve body and extends across the flow port. The valve element has a semi-cylindrical portion of a diameter at least equal to the dimension of the flow port transverse to the axis of rotation of the valve element in the valve body and a relief in one side thereof so that rotation of the valve element in the valve body is effective to throttle the flow through the flow port.

Another feature of this invention is adapted to be embodied in a valve block that is adapted to be positioned between a pair of elements for controlling the flow between respective of their ports. The valve block has a pair of opposed surfaces each adapted to be sealingly engaged with a surface of the respective of the elements. A control part extends through the valve block from one of the faces to the other of its faces and is adapted to permit flow between the respective ports of the elements. The valve block has side surfaces that extend between opposite sides of the opposing surfaces and end surfaces that extend between opposing ends of the opposing surfaces. A control valve element is supported for rotation about an axis that extends between the side surfaces and which is positioned for directly controlling the flow through the control port. Operating means are provided for the control valve element that are accessible at one of the end faces for rotating the valve element about its axis for controlling the flow through the control port.

DETAILED DESCRIPTION OF THE PREFERRED EMBODIMENT

Figure 1:
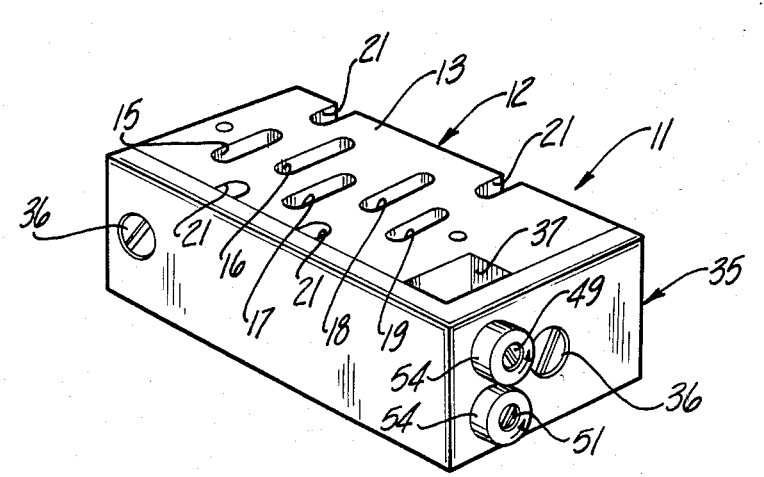
FIG. 1 is a perspective view of a flow control valve embodying this invention.
Figure 2:
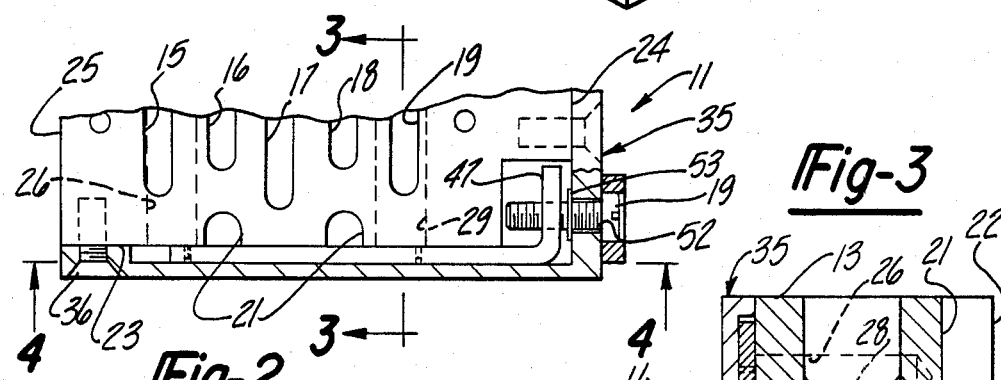
FIG. 2 is a partial top plan view of the valve, with portions broken away.
Figure 3:
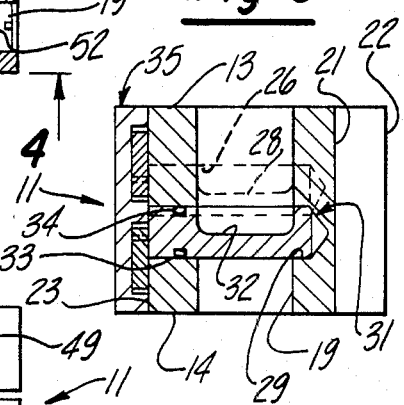
FIG. 3 is a cross-sectional view taken along the line 3—3 of FIG. 2.
Figure 4:
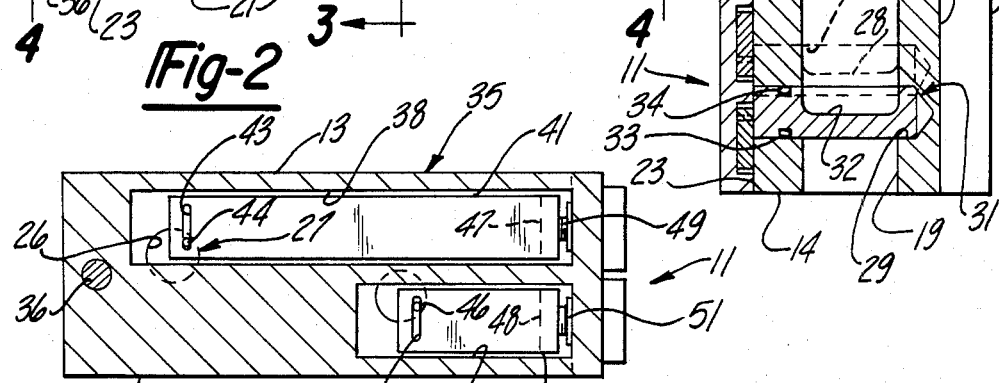
FIG. 4 is a cross-sectional view of the valve taken generally along the line 4—4 of FIG. 2.
Figure 5:
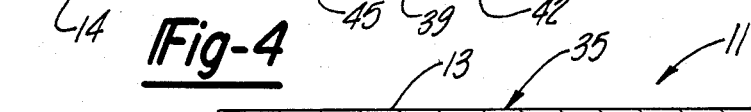
FIG. 5 is a view, in part similar to FIG. 4, showing the operation of the valve actuator.
Figure 5:
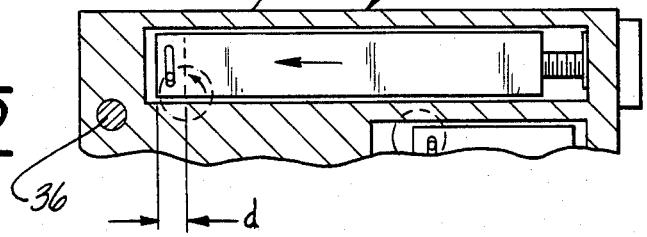

In the drawings the reference numeral 11 indicates generally a flow control assembly embodying this invention. the flow control assembly 11 is particularly adapted to be embodied in conjunction with a base mounted valve assembly, as will become more apparent.

The flow control assembly 11 includes a block, indicated generally by the reference numeral 12, having an upper surface 13 and a lower surface 14, which are generally planar in shape. A number of flow control ports 15, 16, 17, 18 and 19 extend through the block 12 from the face 13 to the face 14. The ports 15, 16, 17, 18 and 19 are generally rectangular in configuration in that they have parallel opposing sides joined by rounded end portions and extend perpendicularly to the upper and lower faces 13 and 14. Recesses 21 extend through the valve block 12 from the face 13 to the face 14. The recesses 21 open through either of side faces 22 and 23 of the block 12, which side faces 22 and 23 extend perpendicularly to the top and bottom faces 13 and 14 and are adapted to pass fasteners such as bolts for attachment of the various fluid system components.

The valve block 12 further includes a front face 24 and a rear face 25.

The flow control assembly 11 is adapted to be interposed in a fluid circuit between at least a pair of elements such as a base (not shown) and a valve (not shown). When so mounted, the upper and lower surfaces 13 and 14 will be sealingly engaged with the associated fluid system components and one or more of the ports 15 through 19 will provide fluid communication between these elements. With such arrangements, it has been the practice to provide some form of throttling or flow control through at least some of the ports for controlling the degree of communication and such features as the speed of reaction of the associated system. With the type of flow control assemblies heretofore provided, it has been necessary to core separate flow controlling passages in which needle valves or the like are employed for controlling the communication and, accordingly, the speed of reaction of the associated system. The use of such cored passageways obviously adds to the cost, requires additional machining and frequently results in the location of the needle valve so that it cannot be readily accessed on the completed assembly. That is, it is desirable to have the valve control at either the front or rear faces 24, 25 of the flow control assembly 11 and all of the controls in the same face so as to facilitate adjustment. Normally, these are the only two faces of the control assembly 11 which will be accessible. In accordance with this invention, an improved control valve arrangement is employed that does not require specially cored passages and also which facilitates adjustment at the front face 24, as will become apparent.

In accordance with the invention, the flow through the ports 15 and 19 is controlled by valve assemblies to be described. A cylindrical bore 26 is drilled transversely through the valve block 12 from the side face 23 toward the opposing side face 22. The drilled bore 26 intersects the port 15 but is of larger diameter than the transverse dimension of the port 15. The axis of the bore 25 is offset relative to the port 15 and, in fact, may extend along one peripheral side of the port 15. A cylindrical valve element, indicated generally by the reference numeral 27, is supported within the bore 26. The valve element 27 is formed with a recess 28 in one of its sides that extends the length of the port 25. The recess 28 is sized so that when the valve element 27 is in its fully opened position, there will be no restriction to the flow through the port 15. Alternatively, rotation of the valve element 27, in the manner to be described, of sufficient degree will be sufficient to close off the port 15.

A similar valve bore 29 extends from the face 23 toward the face 22 and intersects the port 19. A valve element 31 is supported in the bore 29 and also has a recess 32 that is cooperable, upon the angular rotation of the valve element 31, so as to control the flow through the port 19. As with the port 15, the bore 29 is offset and the diameter of the valve element 31 is substantially greater than the transverse dimension of the port 19. Again, the recess 32 is sized so as to provide either no restriction through the port 19 or full closure of the port 19.

Each valve element 27 and 31 is provided with a circumferential groove 33 in which an O-ring seal 34 is provided so as to seal the respective open end of the bore 26 or 29.

A generally L-shaped cover, indicated generally by the reference numeral 35, is affixed to the block 12 by means of a pair of screws 36, one of which is threaded into the front face 24 and the other of which is threaded into the side face 23. The cover 35 encloses a generally vertically extending rectangular recess 37 formed at the juncture between the front and sides faces 24, 23. The long leg of the cover 35 is provided with a long, generally rectangular recess 38 and a smaller generally rectangular recess 39. A long actuating rod 41 is slidably supported within the recess 38 and a shorter actuating rod 42 is slidably supported within the recess 39. The rod 41 is formed with a vertically extending slot 43 into which a pin 44 extends. The pin 44 is eccentrically pressed into the end of the valve element 27 so that sliding movement of the rod 41 in the recess 38 will effect rotation of the valve element 27. In a like manner, the actuating rod 42 is formed with a recess 45 in which a pin 46 that is staked to the valve element 31 is received.

The control rods 41 and 42 have inwardly bent ends 47 and 48 that extend into the valve block recess 37 and which have tapped openings to receive actuating screws 49 and 51 respectively. The actuating screws 49 and 51 pass through enlarged bores 52 in the cover plate 35 and are axially fixed relative to the cover plate 35 by means of snap or E-rings 53 and the enlarged heads of the screws 49 and 51. The heads of the screws 49 and 51 are protected by means of cylindrical collars 54 that are affixed in a suitable manner to the cover plate 35.

It should be readily apparent that rotation of either of the adjusting screws 49 or 51 will cause axial movement of the respective control rod 41 or 42 relative to the block 12 and cover plate 35. Such axial movement will be transmitted into rotary movement of the respective valve element 27 or 31 because of the pin and slot connections 43, 44 or 45, 46. Thus, the angular position of the valve elements 27 or 31 may be readily controlled from the front face of the flow control assembly 11. In addition, as has been previously noted, the valve elements 27 and 31 are positionable between a fully closed position in which the respective ports 15 and 19 are closed or a fully opened position wherein there is no restriction to the flow through either of the ports.

It should be readily apparent from the foregoing description that a flow control assembly has been provided in which throttling of a port may be easily accomplished without necessitating cored passages in the valve block. Furthermore, this adjustment may be made from the front face of the valve and, thus, facilitates adjustment even when installed in a system. In the illustrated embodiment two flow controlling valve elements are employed. It should be readily apparent that the invention is susceptible of use with greater or lesser number of controlling valve elements. Regardless of the number of controlling valve elements, however, it is desirable to provide the operators for all of them at the same end of the valve block. Furthermore, it is not necessary that the flow controlling arrangement be incorporated in a separate valve block. Alternatively, the described flow controlling arrangement may be incorporated directly in the base or in a main valve assembly without departing from certain aspects of the invention. Also, the specific construction of the valve block may be varied as may the method of transmitting movement from the operators to the flow controlling elements. recesses in the flow controlling elements may also be altered to suit specific installations. Various other changes and modifications may be made without departing from the spirit and scope of the invention, as defined by the appended claims.

I claim:

1. A flow control element for interpositioning in a fluid system comprising a valve body adapted to be interposed between a pair of elements of the system having fluid ports adapted to communicate with each other, said valve body having a pair of spaced flow ports extending through oppositely facing faces thereof and adapted to provide the communication between respective pairs of said element ports when received therebetween, said flow ports having a non-cylindrical cross section comprised of parallel sides joined by rounded end portions, a pair of valve elements rotatably supported in said valve body and each extending across a respective one of said flow ports, said valve elements each having a semi-cylindrical portion of a diameter at least equal to the transverse dimension between said parallel sides of the respective flow control port transverse to the axis of said valve element and a relief in one side, each of said valve elements having a pin eccentrically affixed thereto and further including a pair of slidably supported valve operators each having a transversely extending slot receiving a respective one of said pins for rotating the respective valve element.

2. A flow control element as set forth in claim 1 wherein each of the valve element cylindrical portions has a diameter substantially greater than the width of the respective flow port, the recess having a width substantially equal to the width of the flow port and the axis of rotation of the valve element being disposed eccentrically to the valve port.

3. A valve block adapted to be positioned between a pair of elements for controlling the flow between respective of their ports, said valve block having a pair of oppositely facing surfaces, each adapted to be sealingly engaged with a surface of a respective one of said elements, a pair of spaced control ports extending through said valve block from one of said oppositely facing surfaces to the other of said oppositely facing surfaces, each of said control ports being adapted to permit flow between the respective ports of said elements, said valve block having side surfaces each extending between adjacent sides of said oppositely facing surfaces and end faces each extending between adjacent ends of said oppositely facing surfaces, a pair of control valve elements each supported for rotation about an axis extending between said side surfaces and positioned for directly controlling the flow through a respective of said control ports, and separate operating means for each said control valve element accessible at one of said end faces and including respective motion transmitting elements extending through recesses formed along of said side surfaces and operatively connected to the respective valve element for rotating said valve element about its axis for controlling the flow through said control port and a cover plate covering said recesses.

4. A valve block as set forth in claim 3 wherein there are a plurality of flow ports extending between the oppositely facing surfaces and between the control ports.

5. A valve block as set forth in claim 3 wherein the motion transmitting elements are slidably supported within the recess.

6. A valve block as set forth in claim 3 wherein each of the valve elements has an actuating pin affixed thereto eccentric to its rotational axis and the respective motion transmitting element comprises an operating rod slidably supported relative to one of the side faces of the valve block and having a slot receiving said pin.

7. A valve block as set forth in claim 6 wherein the motion transmitting elements are slidably supported within the recess.

* * * * *